US011574237B2

(12) United States Patent
Ardila et al.

(10) Patent No.: US 11,574,237 B2
(45) Date of Patent: *Feb. 7, 2023

(54) QUICK PATH TO TRAIN, SCORE, AND OPERATIONALIZE A MACHINE LEARNING PROJECT

(71) Applicant: MICROSOFT TECHNOLOGY LICENSING, LLC, Redmond, WA (US)

(72) Inventors: Pedro Ardila, Seattle, WA (US); Christina Storm, Seattle, WA (US); Mohan Krishna Bulusu, Bellevue, WA (US); Raymond Ramin Laghaeian, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1002 days.

This patent is subject to a terminal disclaimer.

(21) Appl. No.: 16/272,769

(22) Filed: Feb. 11, 2019

(65) Prior Publication Data
US 2019/0171972 A1  Jun. 6, 2019

Related U.S. Application Data

(63) Continuation of application No. 14/562,421, filed on Dec. 5, 2014, now Pat. No. 10,210,463.

(51) Int. Cl.
*G06N 20/00* (2019.01)
(52) U.S. Cl.
CPC ............................. *G06N 20/00* (2019.01)

(58) Field of Classification Search
CPC ....................................................... G06N 20/00
USPC .............................................................. 706/12
See application file for complete search history.

(56) References Cited

U.S. PATENT DOCUMENTS

2007/0143736 A1* 6/2007 Moriarty ................ G06Q 10/06
715/201

OTHER PUBLICATIONS

Chong et al ("Collaborative Analytics with Genetic Programming for Workflow recommendation" 2013) (Year: 2013).*
Fan et al ("Designing Contextualized Workflows in the Cloud" 2013) (Year: 2013).*

(Continued)

*Primary Examiner* — Lut Wong
(74) *Attorney, Agent, or Firm* — Workman Nydegger

(57) ABSTRACT

Automatically detecting and anticipating that an additional machine learning experiment may be needed. A method includes after successfully running a first experiment workflow, automatically prompting a user that an additional experiment workflow may be needed based on specific criteria associated with the first experiment workflow. The method further includes receiving input from the user confirming the additional experiment workflow. As a result of receiving input from the user confirming the additional experiment workflow, the method further includes the system automatically reconfiguring the first experiment workflow, including automatically identifying all necessary modules for the additional experiment workflow and connecting them properly to perform the intended second experiment workflow. The method further includes displaying to the user the first experimental workflow transitioning from the first experiment workflow to the additional experiment workflow.

20 Claims, 16 Drawing Sheets

(56) References Cited

OTHER PUBLICATIONS

Ahmed et al ("Dynamic Approach for Data Scrubbing Process" 2010) (Year: 2010).*
Zhang et al ("Recommend-As-You-Go: A Novel Approach Supporting Services-Oriented Scientific Workflow Reuse" 2011) (Year: 2011).*

* cited by examiner

QUICK PATH TO TRAIN, SCORE, AND OPERATIONALIZE A MACHINE LEARNING PROJECT

BACKGROUND

Background and Relevant Art

This application is a continuation of U.S. patent application Ser. No. 14/562,421 filed on Dec. 5, 2014, which issued as U.S. Pat. No. 10,210,463 on Feb. 19, 2019, entitled "QUICK PATH TO TRAIN, SCORE, AND OPERATIONALIZE A MACHINE LEARNING PROJECT," and which application is expressly incorporated herein by reference in its entirety.

Machine learning systems, such as Azure Machine Learning available from Microsoft Corporation of Redmond, Wash., allow data scientists to create a predictive model and put it into production, such as into a web service that allows incoming data to be applied to the predictive model. In particular, a training experiment may be performed by applying test data to the predictive model to train the predictive model. Information gathered from the training experiment may be used to create a scoring experiment that allows the trained predictive model to be used with real world and real time data to perform predictive functionality on the real world and real time data. This scoring experiment can be used as the basis for implementing a web service. However, the process of transforming a machine learning training experiment into a scoring experiment, and subsequently into a web service requires a number of distinct steps that may not be intuitive to users. Thus, a technical problem may exist where it may be useful to simplify the process of transforming training experiments into scoring experiments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes a system for automatically detecting and anticipating that an additional machine learning experiment may be needed. The system includes one or more processors and one or more computer-readable media. The one or more computer-readable media include computer-executable instructions that when executed by at least one of the one or more processors cause the system to perform the following method. The method includes after successfully running a first experiment workflow, automatically prompting a user that an additional experiment workflow may be needed based on specific criteria associated with the first experiment workflow. The method further includes receiving input from the user confirming the additional experiment workflow. As a result of receiving input from the user confirming the additional experiment workflow, the method further includes the system automatically reconfiguring the first experiment workflow, including automatically identifying all necessary modules for the additional experiment workflow and connecting them properly to perform the intended second experiment workflow. The method further includes displaying to the user the first experimental workflow transitioning from the first experiment workflow to the additional experiment workflow.

Another embodiment may be practiced in a computing environment and includes a method of automatically detecting and anticipating that an additional machine learning experiment may be needed. The method includes after successfully running a first experiment workflow, automatically prompting a user that an additional experiment workflow may be needed based on specific criteria associated with the first experiment workflow. The method further includes receiving input from the user confirming the additional experiment workflow. As a result of receiving input from the user confirming the additional experiment workflow, the method further includes the system automatically reconfiguring the first experiment workflow, including automatically identifying all necessary modules for the additional experiment workflow and connecting them properly to perform the intended second experiment workflow. The method further includes displaying to the user the first experimental workflow transitioning from the first experiment workflow to the additional experiment workflow.

Another embodiment includes a system for creating a scoring experiment from a training experiment. The system includes one or more processors and one or more computer-readable media. The one or more computer-readable media include computer-executable instructions that when executed by at least one of the one or more processors cause the system to perform the following method. The method includes identifying elements of a training experiment. The method further includes identifying consolidation and elimination of elements in the training experiment for a scoring experiment. The method further includes determining that the user wishes to have a scoring experiment created from the training experiment. The method further includes consolidating and eliminating the identified elements create the scoring experiment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1F illustrates a screen capture of the user interface showing an animation combining elements;

DETAILED DESCRIPTION

Figure 1A:
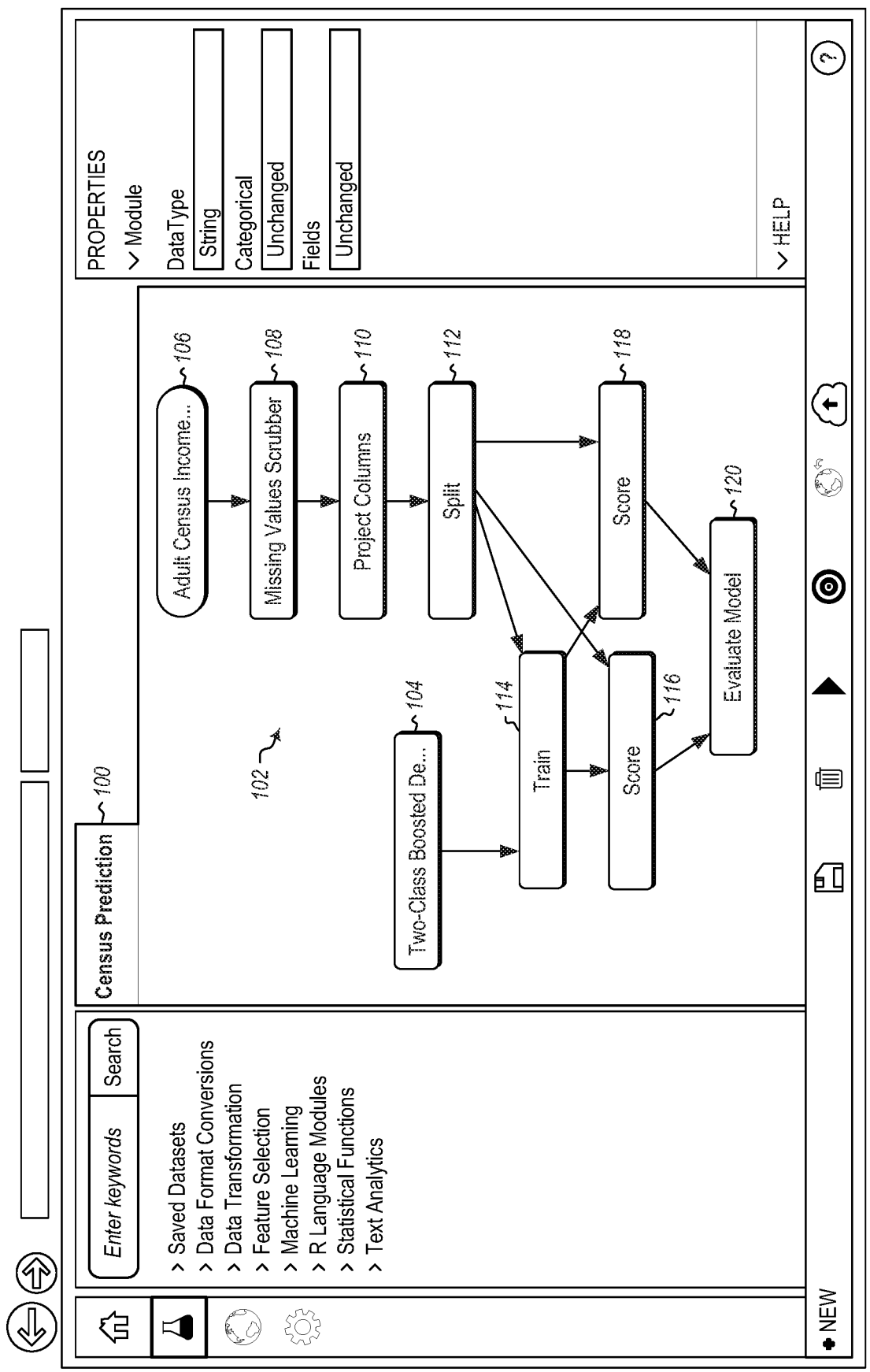
FIG. 1A illustrates a user interface with a workflow representing a training experiment.

Embodiments herein may implement a system for designing and/or implementing a defined, linear workflow which handholds the user from a training experiment, to a scoring experiment, to a web service, making the operationalization process simple and intuitive. Embodiments of the system may guide the user through the process of creating a web service through a series of hints and clearly defined steps. Some embodiments can analyze a user's training experiment and prune the training experiment to create a scoring experiment, which is a shareable and consolidated form of a trained version of the training experiment. In the example illustrated, the determination that a scoring experiment should be created from a training experiment can be made based on the training experiment having a training module and an algorithm module in the training experiment, which indicate that the user may wish to create a simplified scoring experiment from the training experiment.

By analyzing a user's training experiment and pruning the training experiment to create a scoring experiment, a technical effect of increased user efficiency and/or increased user interaction performance can be achieved. In particular, by consolidating training experiment elements into scoring experiment elements, and removing elements that are only needed for the training experiment, a user's effort in evaluating an experiment can be reduced as the user can more efficiently evaluate elements on the screen. This can reduce the user's mental efforts. Further, the elements are arranged on the screen more efficiently for more efficient user interaction.

Additionally the system performance can be increased by eliminating the need for much of the detailed user interaction previously required to define scoring experiments from training experiments. Rather, by the system automatically determining how a scoring experiment should be created from a training experiment, the user interaction can be eliminated, or at least drastically reduced. This user interaction is typically costly in terms of computing resources as processes are interrupted and diverted to handle user interface interactions. Thus, rather than the system needing to divert resources to handle user interface interrupts, the system can use those computing resources to more quickly perform various machine learning, or other tasks. Thus, by eliminating certain costly operations, computing resources can be used to perform other operations faster, thus improving the overall performance of the system.

Once the consolidated form of the trained version of the training experiment is completed correctly, i.e. the scoring experiment, publishing a web service API can be efficiently performed.

Thus, a user can draw a production workflow by dragging and dropping various modules, and with a few clicks, create a public REST API that embeds custom logic and machine learning models. Embodiments can automatically handle the deployment, including capacity provisioning, load balancing, auto-scaling and health monitoring, so that the user does not have to worry about deploying, scaling or monitoring the newly created web service. Enterprise and mobile applications can leverage cloud hosted intelligence at scale by using such web services.

Referring now to FIGS. 1A-1L, a functional example is illustrated. FIG. 1A illustrates a graph 102 that represents a training experiment 100. In particular, the training experiment 100 may be an experiment to train an algorithm to predict approximate income based on input data.

FIG. 1A illustrates an algorithm module 104. The algorithm module 104 includes a machine learning algorithm, which once trained, can predict an individual's income based on certain data about that individual provided to the algorithm module 104.

The graph 102 illustrated in FIG. 1A may be constructed by a user dragging and dropping modules onto a canvas for the training experiment 100. The following will now describe various modules and inputs used in the training experiment.

FIG. 1A illustrates Adult Census Income input data 106. This particular data is only for example purposes and it should be appreciated that other data may be implemented in alternate examples. This input data 106 includes various pieces of information correlated to income. Thus, for example, a record in the input data 106 may include occupation, home address, age, other demographic information, and income.

The information in the input data 106 may be fed into a missing values scrubber module 108, or other data transformation module(s). In the present example, the missing values scrubber module 108 checks for empty or wrong values in a column and replaces them with user defined values. However, other data manipulation modules may be alternatively or additionally included according to a user's preference.

FIG. 1A further illustrates a project columns module 110. The project columns module 110 allows embodiments to select columns of data to include or exclude in the model. This may include excluding data columns that are irrelevant or that do not include any data.

FIG. 1A further illustrates a split module 112. The split module 112 splits the data from the input data 106 into two different portions. For example, 60% of the input data may be used to train the predictive model, while the other 40% is used to test the trained predictive model. While a 60/40 split is illustrated here, it should be appreciated that the split may be user configurable and can be any ratio selected by the user. However, in the illustrated example, 60% of the data from the input data 106 is sent to the train module 114 and the score module 116 where it will be used in conjunction with the algorithm module 104 to estimate income for an individual. Because the input data 106 includes income data, the train module 114, the score module and the algorithm module 104 can use the other data in the input data 106, as operated on by the missing values scrubber 108, the project columns module 110 and the split module 112 to train the predictive model. The output of the train module 114 is provided to the score module 116 which generates an income prediction based on the input data 106.

FIG. 1A further illustrates that the other 40% of the input data 106 is sent directly to a score module 118. The score module scores the data without the benefit of the train module 114 and the algorithm module 104.

The results from the two score modules 116 and 118 can be compared by an evaluate module 120 to determine the accuracy of the predictive model. In this particular example, the evaluate module 120 includes functionality to determine that the scores from the score modules 116 and 118 are sufficiently different to indicate that the training of the algorithm module 104 has been effective.

While various modules are illustrated above, it should be appreciated that a virtually unlimited number of different types of data transformation modules may be implemented. For example, in some embodiments, filter modules may be implemented. Such filter modules may be, for example, one or more of an Apply Filter, FIR Filter, IIR Filter, Median Filter, Moving Average Filter, Threshold Filter, User Defined Filter, etc. module. In some embodiments, manipulation modules may be implemented. Such manipulation modules may be, for example, one or more of an Add Columns, Add Rows, Group Categorical Values, Indicator Values, Join, Metadata Editor, Missing Values Scrubber, Project Columns, Remove Duplicate Rows, etc. modules. In some embodiments, sample and split modules may be implemented. Such sample and split modules may be, for example, one or more of a Partition and Sample, Split, etc. module. In some embodiments, scale and reduce modules may be implemented. Such scale and reduce modules may be, for example, one or more of an Apply Quantization Function, Clip Values, Normalize Data, Quantize, etc. module.

Figure 1B:
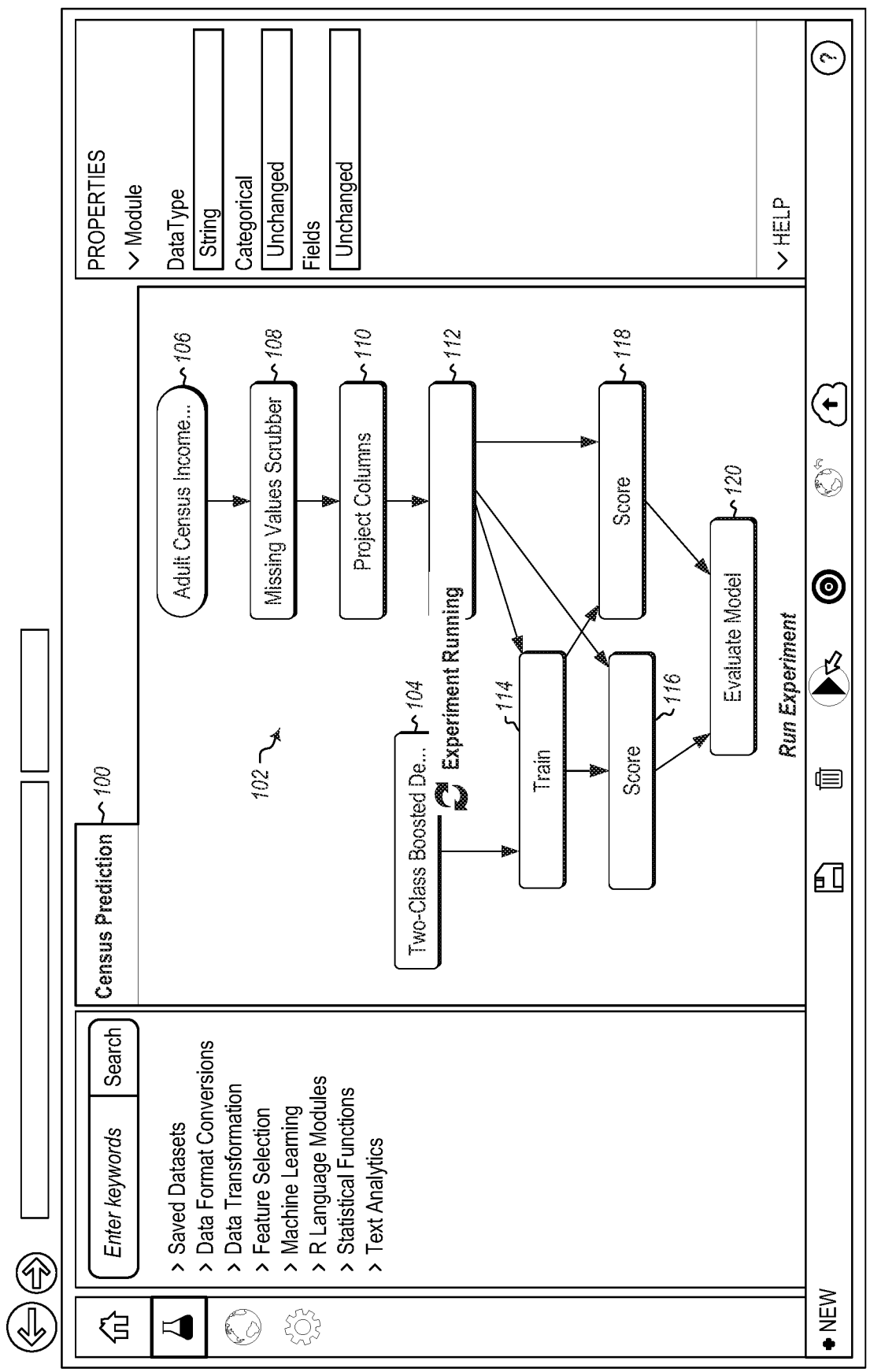
FIG. 1B illustrates user interface showing the training experiment running.

As illustrated in FIG. 1B, the training experiment is run by the system. Running the training experiment creates the appropriate information needed for the train module to allow the algorithm in the algorithm module to be able to accurately predict income based on certain demographic input data.

Figure 1C:
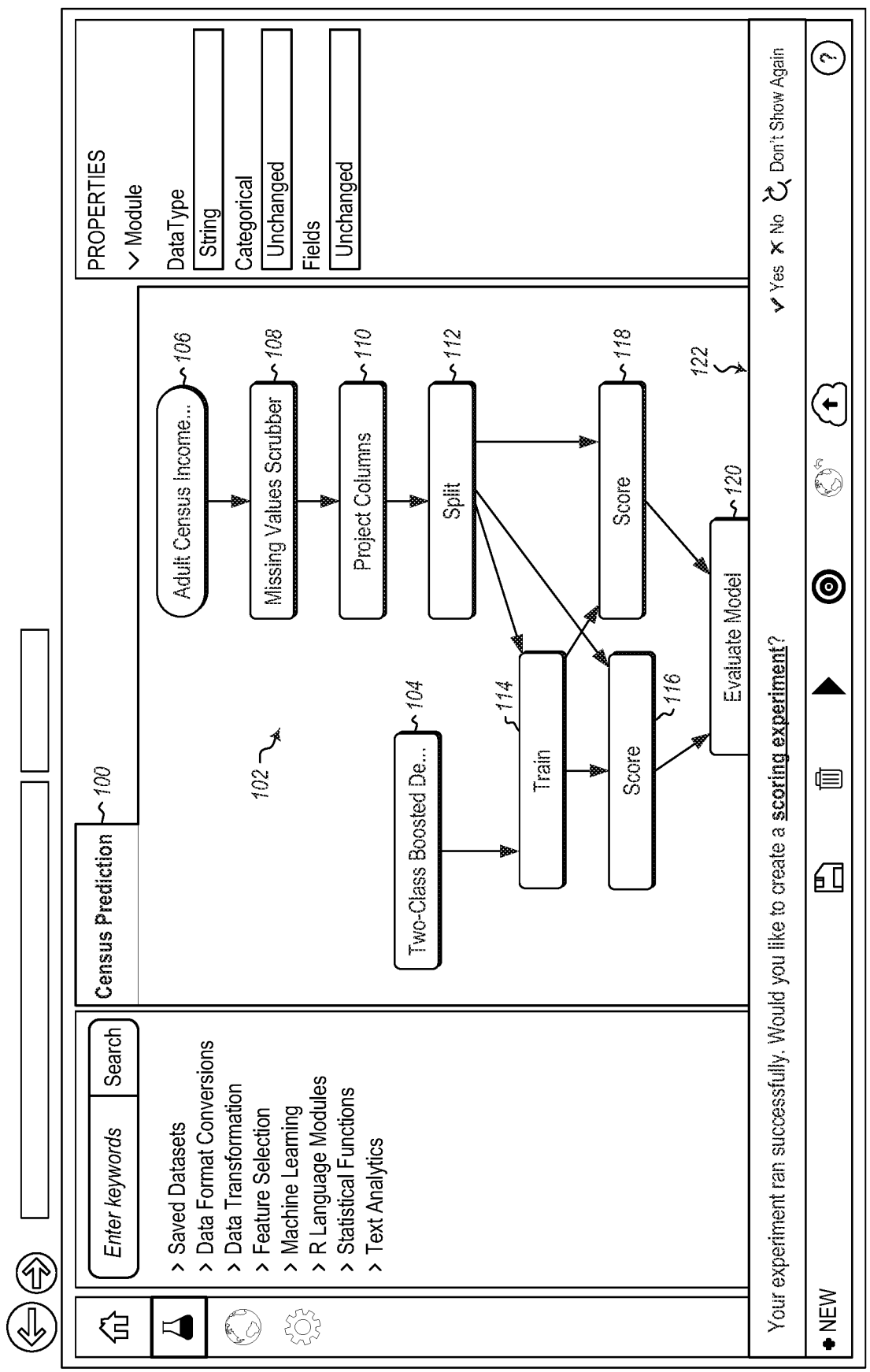
FIG. 1C illustrates the user interface including a prompt to a user for the creation of a scoring experiment.

Once the training experiment has been run successfully, the system can prompt the user to automatically create a scoring experiment. In some embodiments, the system may prompt the user based on recognition by the system that the training experiment 100 is a training experiment. The system can then recognize that a corresponding scoring experiment may need to be created. For example, in some embodiments, the system may identify that both an algorithm module (such as algorithm module 104) and a train module (such as train module 114) exist in an experiment (such as the training experiment 100). This may be an indication that the training experiment 100 is a training experiment for which a corresponding scoring experiment should be created. FIG. 1C illustrates a prompt 122 that asks the user if they would like to create a scoring experiment. If the user clicks "yes", then as illustrated in FIGS. 1D through 1L, a scoring experiment 124 is created. The training experiment 100 is maintained and can be re-accessed by the user as well.

Figure 1D:
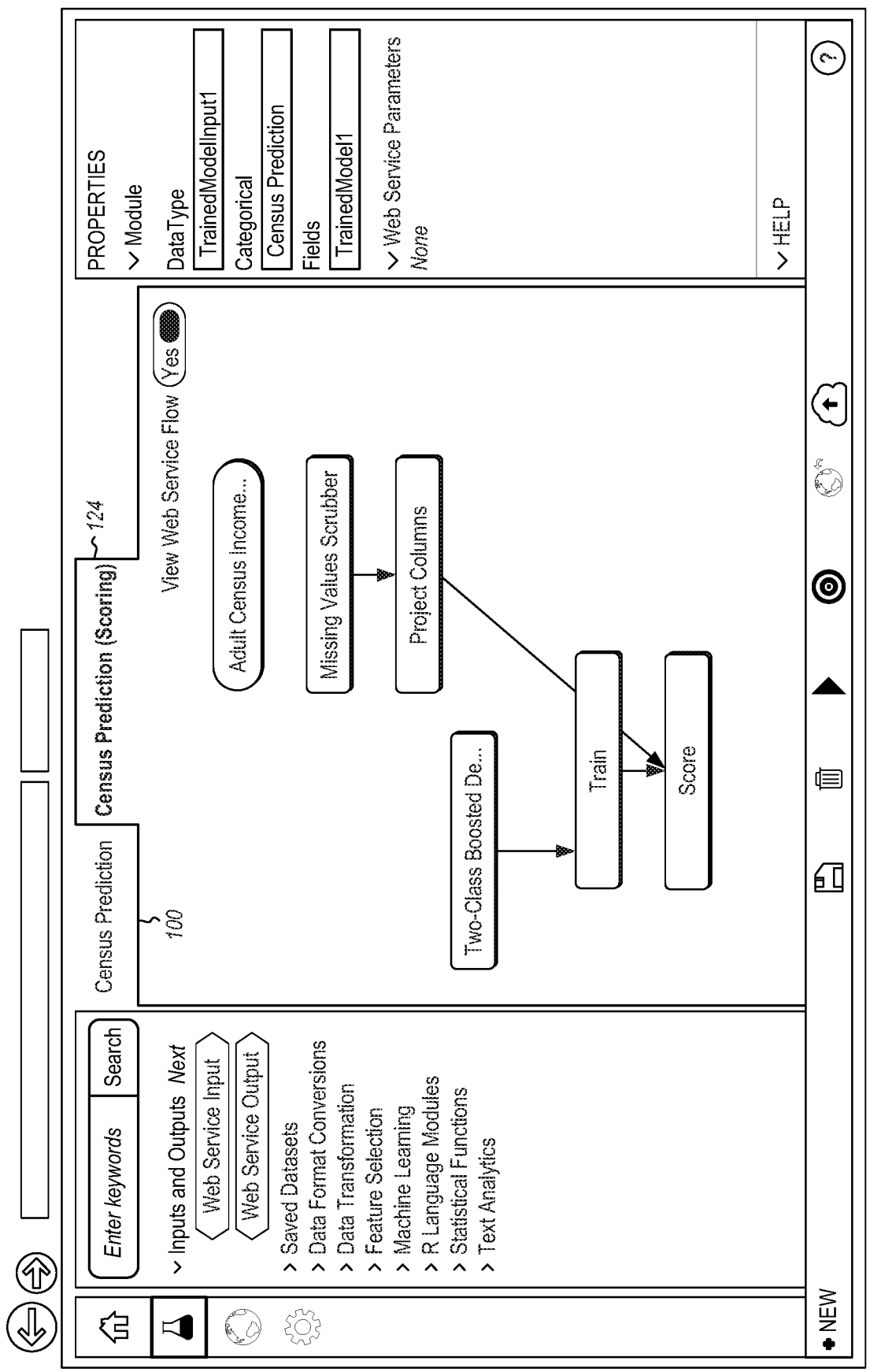
FIG. 1D illustrates the user interface with the elimination of various workflow elements from the training experiment in a scoring experiment.

The scoring experiment 124 is a consolidated version of the training experiment 100. In particular, various elements of the training experiment can be either combined in a graphical representation with other elements, or can be removed completely as they have no needed function in the scoring experiment 124. For example, FIG. 1D illustrates the removal of the split module 112 as such a module is typically not used in a scoring experiment configured to operate on input data that is not training data. Similarly, the corresponding score module 118 is also removed. In some embodiments, removal of elements may be animated to highlight removal to the user. For example, in some embodiments, the split module 112 and the score module 118 may be shown floating off of the screen.

Figure 1E:
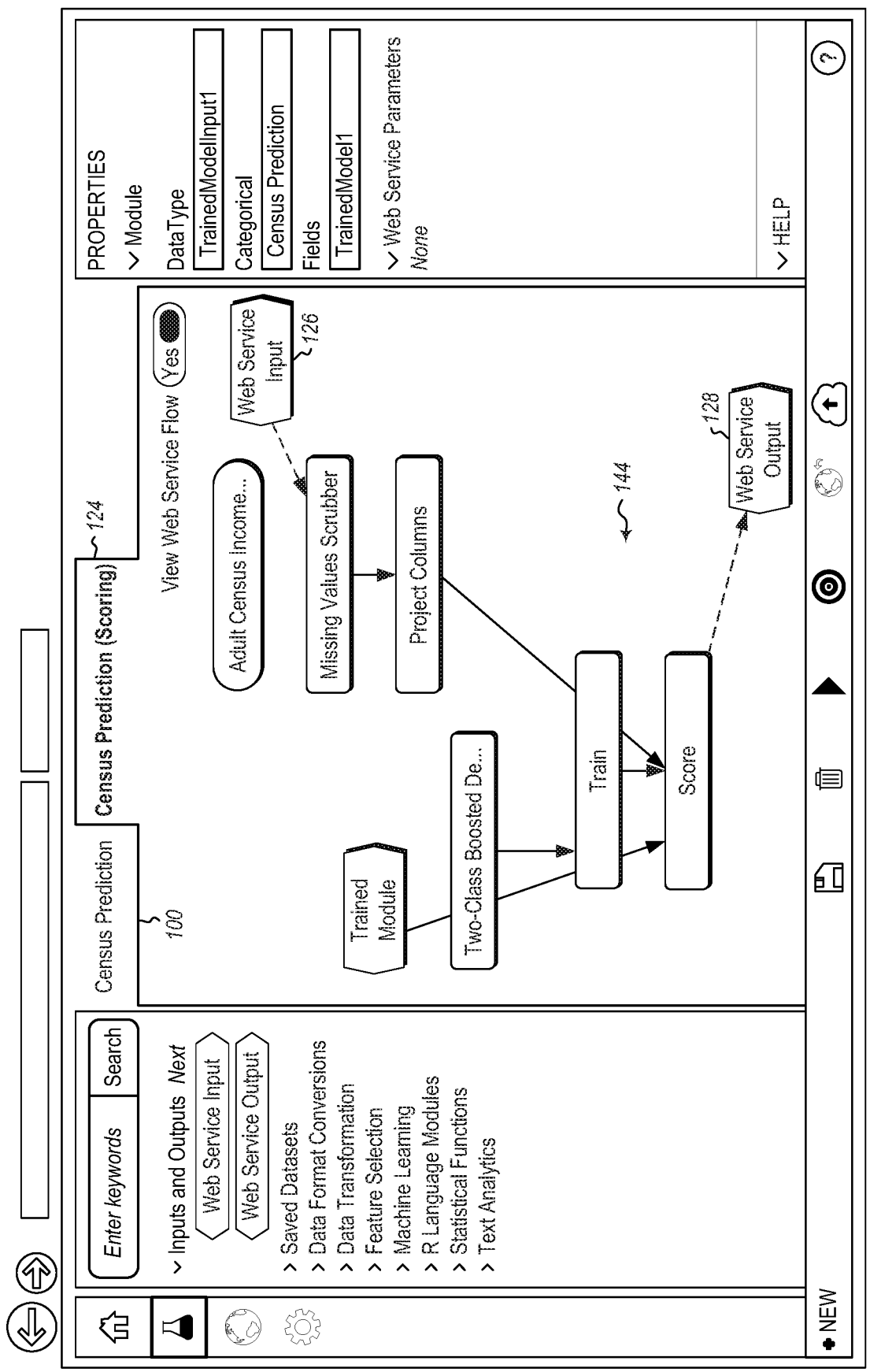
FIG. 1E illustrates the user interface with the addition of web service input and output nodes in the scoring experiment.

FIG. 1E further illustrates the addition of a web service input node 126. The web service input node 126 is used to obtain input data from a web service. For example, the web service input node 126 may include APIs for interacting with various databases or for receiving manually entered input data. In the example illustrated, the web service input node 126 may be able to obtain demographic information about individuals, such as age, home address, occupation, etc., that can be used to determine income for individuals when such input information is provided to other modules in the scoring experiment.

FIG. 1E further illustrates the addition of a web service output node 128. The web service output node 128 is able to provide interface elements that allow, in the illustrated example, predicted income to be provided to a user interface. For example, the web service output module may include APIs that interface with various user interfaces to provide indications of income predictions.

Figure 1F:
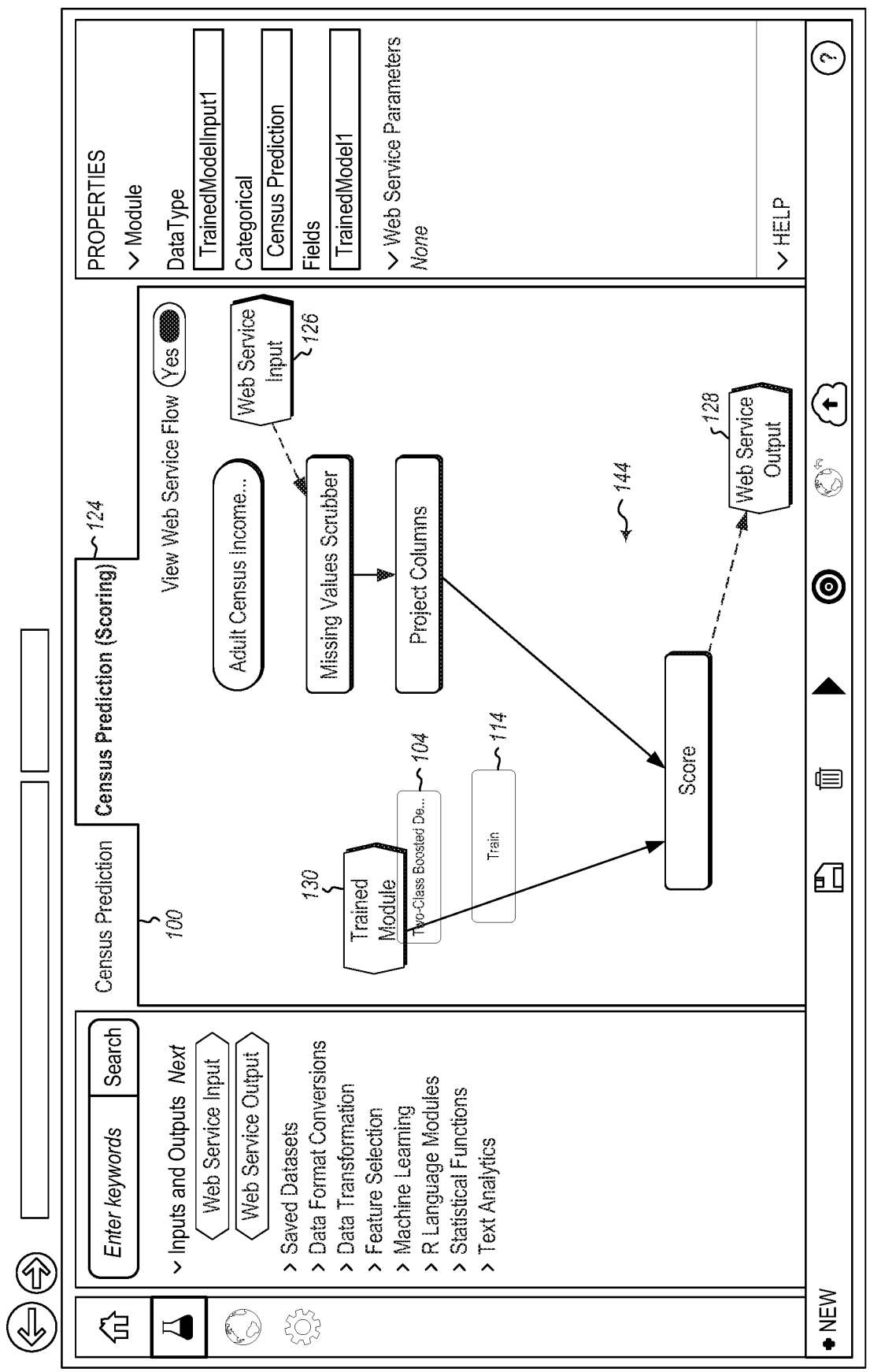
FIG. 1F illustrates

While FIG. 1E illustrates the removal of certain modules (i.e. the split module 112 and the score module 118) and the addition of certain modules (i.e. the web service input node 126 and the web service output node 128), various modules from the training experiment can be consolidated graphically for the user. For example, FIG. 1F illustrates that the algorithm module 104 and the train module 114 are consolidated into a trained model module 130. In some embodiments, this consolidation may be illustrated graphically using an animation to graphically identify for the user the consolidation. For example, FIG. 1F shows a still capture of the algorithm module 104 and the train module 114 as they are floating graphically into the trained module 130.

Figure 1G:
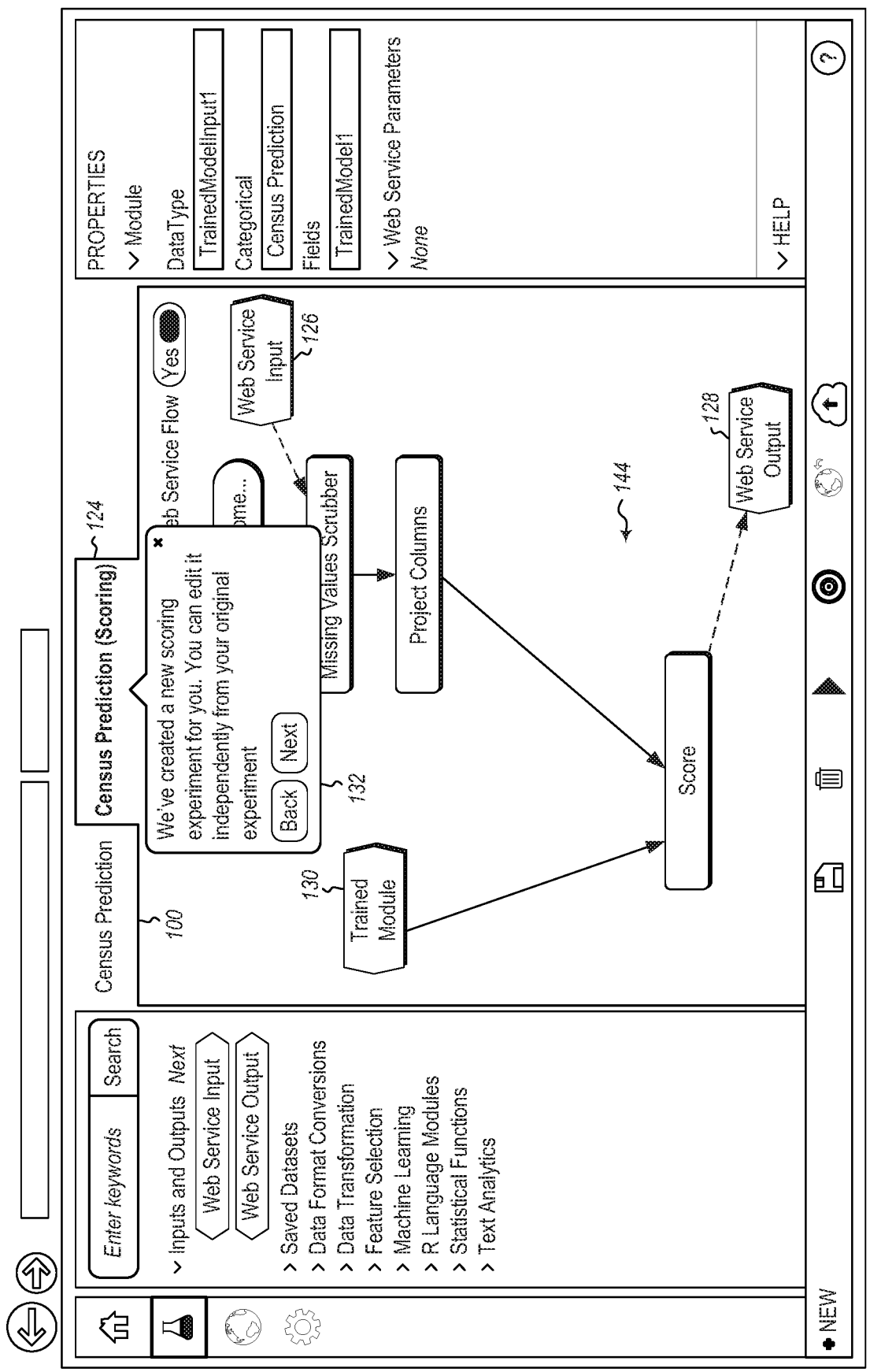
FIG. 1G illustrates a cue describing actions performed for a scoring experiment.

Embodiments may further provide various cues to the user about what operations have been performed to arrive at the scoring experiment 124. For example, FIG. 1G illustrates a cue 132 indicating that the scoring experiment 124 has been created. The cue 132 also indicates to the user that they can edit this experiment independently from the original training experiment 100.

Figure 1H:
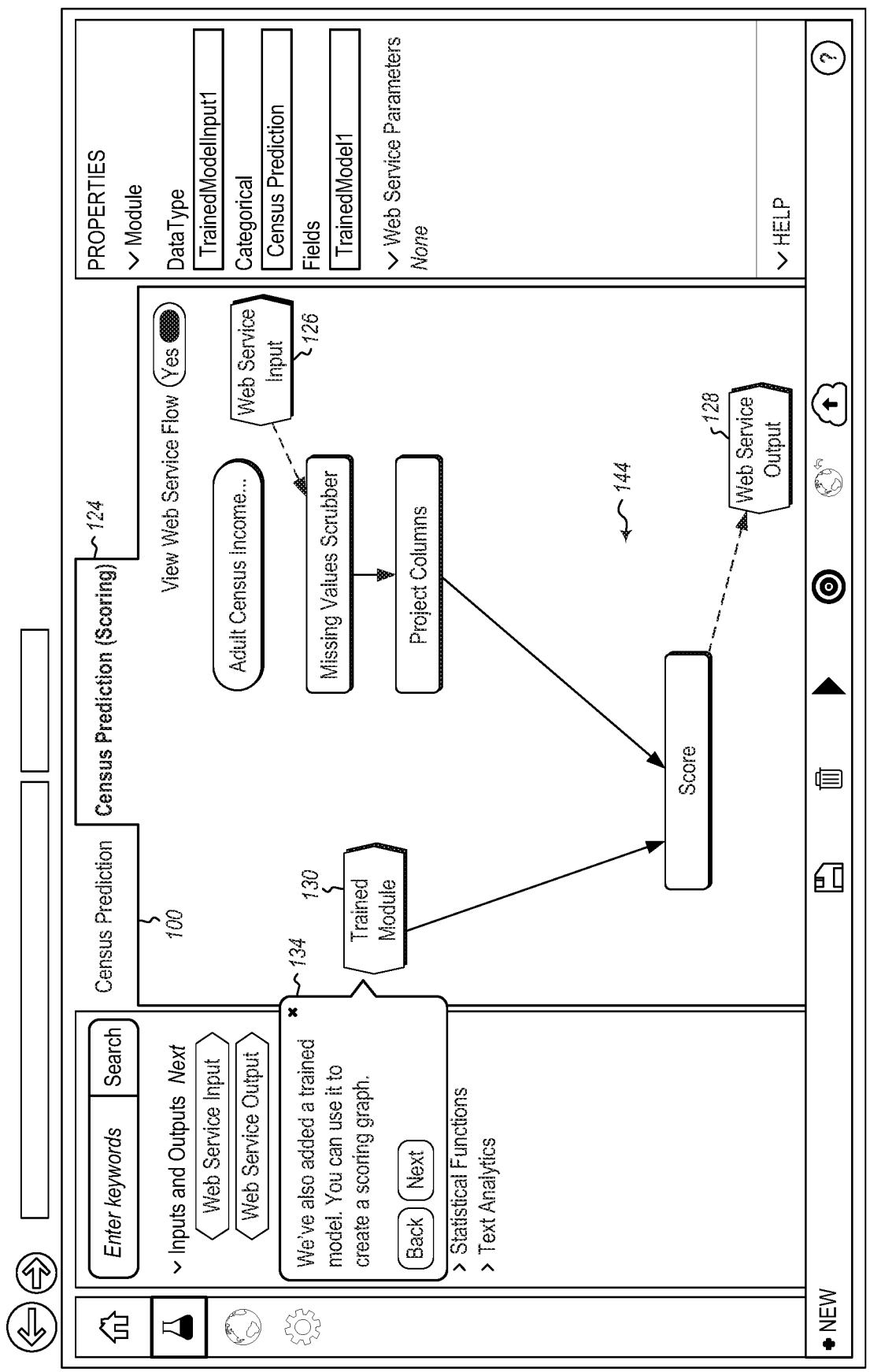
FIG. 1H illustrates another cue describing actions performed for a scoring experiment.

FIG. 1H illustrates a cue 134 indicating that the trained module 130 has been added to the experiment 124 and that the trained module 130 can be used to create a scoring graph.

Figure 1I:
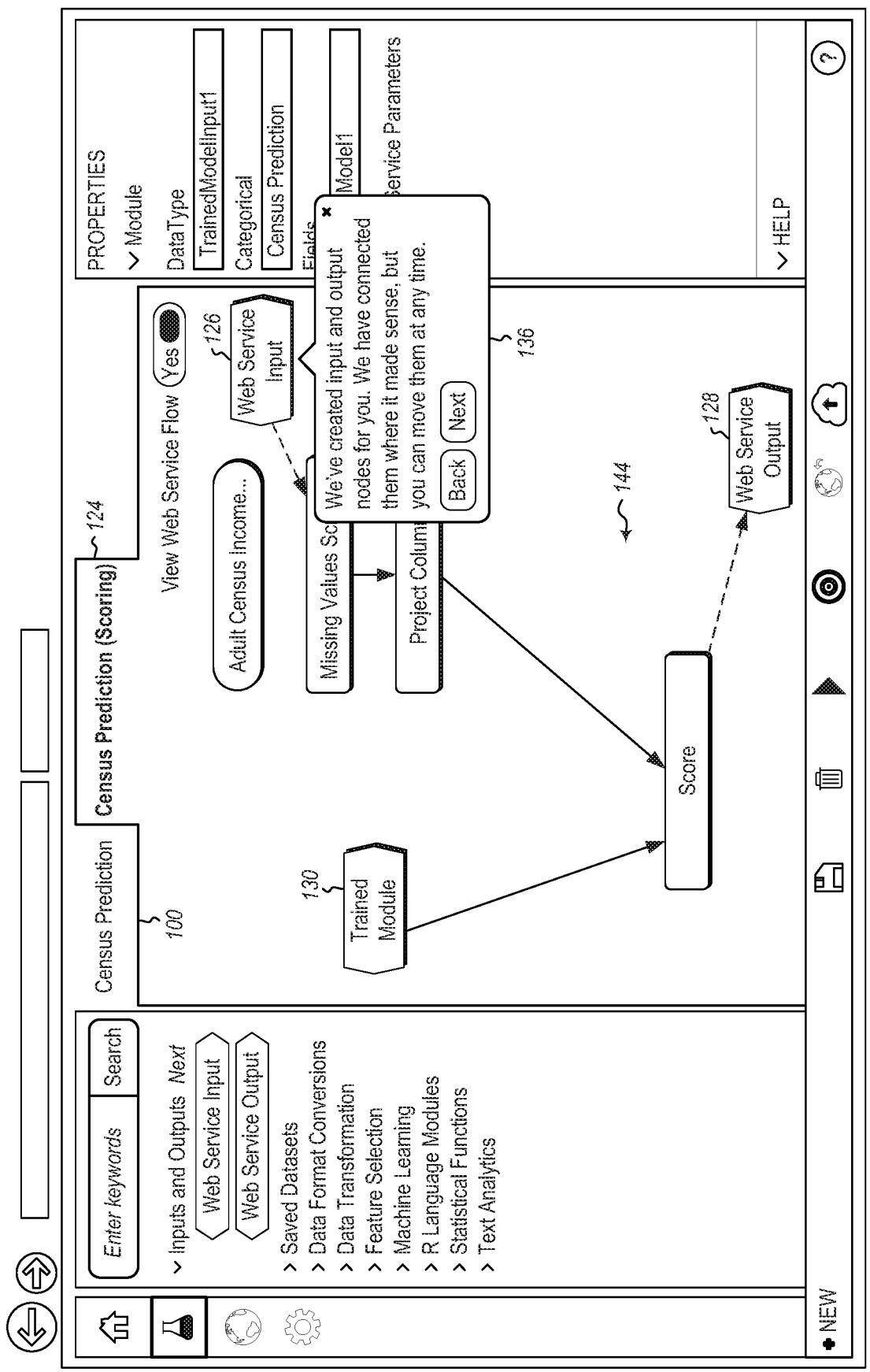
FIG. 1I illustrates another cue describing actions performed for a scoring experiment.

FIG. 1I illustrates a cue 136 indicating that the input and output nodes 126 and 128 have been created. The cue 136 also indicates that these nodes 126 and 128 were automatically placed in a determined position, but that the nodes can be moved by the user if the user finds that moving the nodes is appropriate.

Figure 1J:
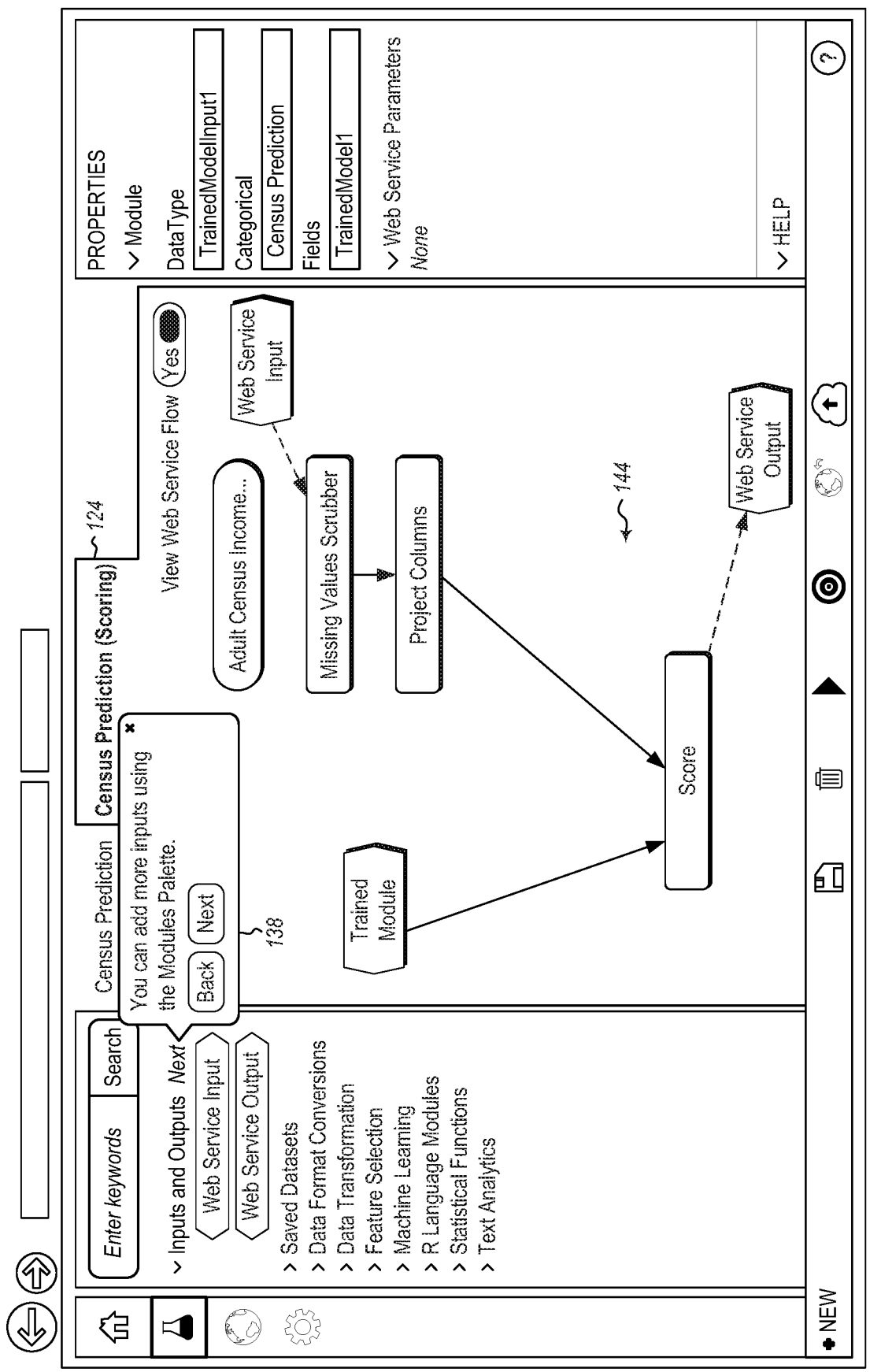
FIG. 1J illustrates another cue describing actions performed for a scoring experiment.

FIG. 1J illustrates a cue 138 directing a user to user interface elements that allow the user to add additional inputs or outputs for use with a web service deployment.

Figure 1K:
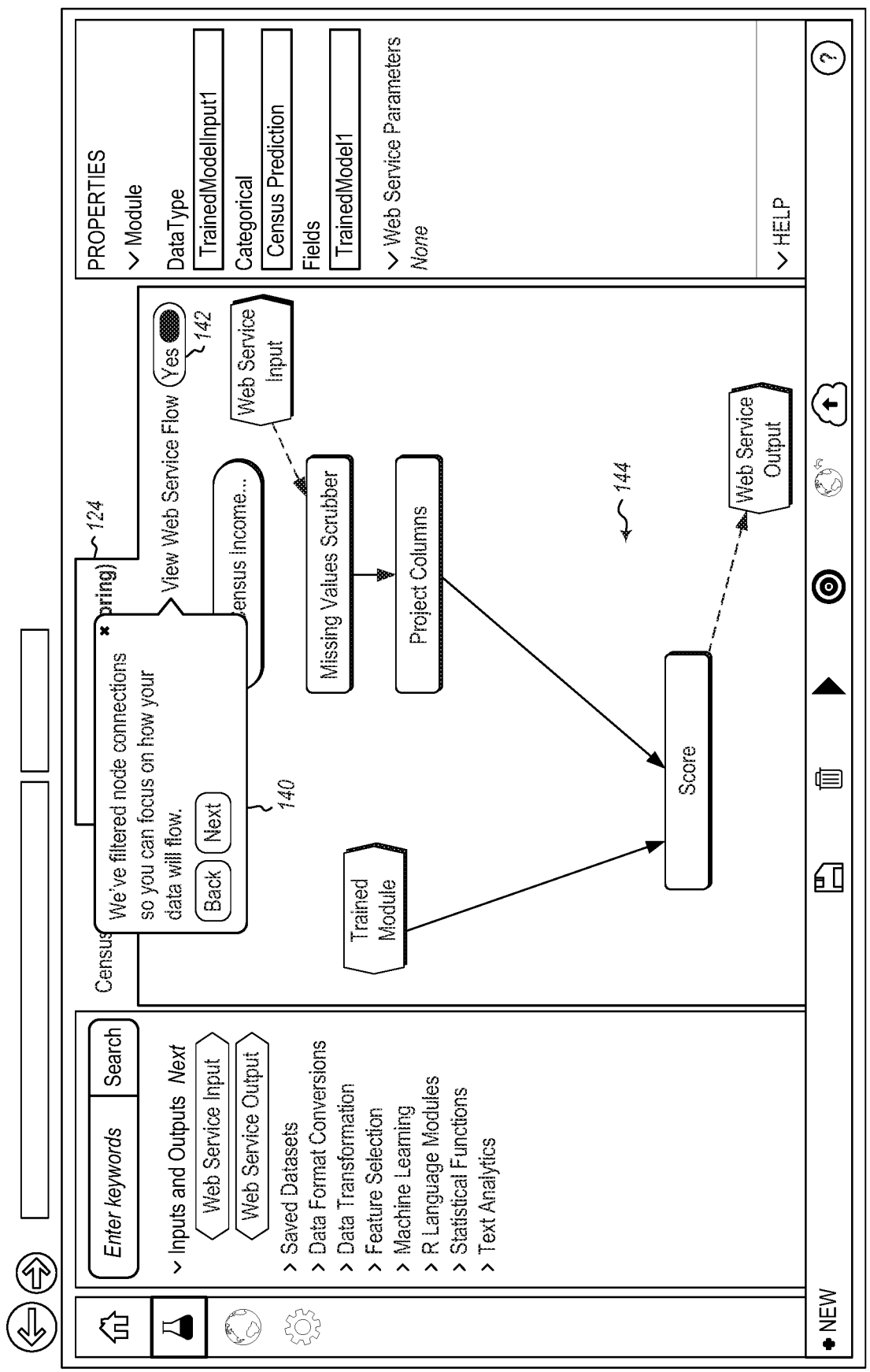
FIG. 1K illustrates another cue describing actions performed for a scoring experiment.

FIG. 1K illustrates a cue 140 directing a user to a web service user interface element 146 that allows the user to toggle on or off a web service view. This will be illustrated in more detail in conjunction with the description of FIG. 1M.

Figure 1L:
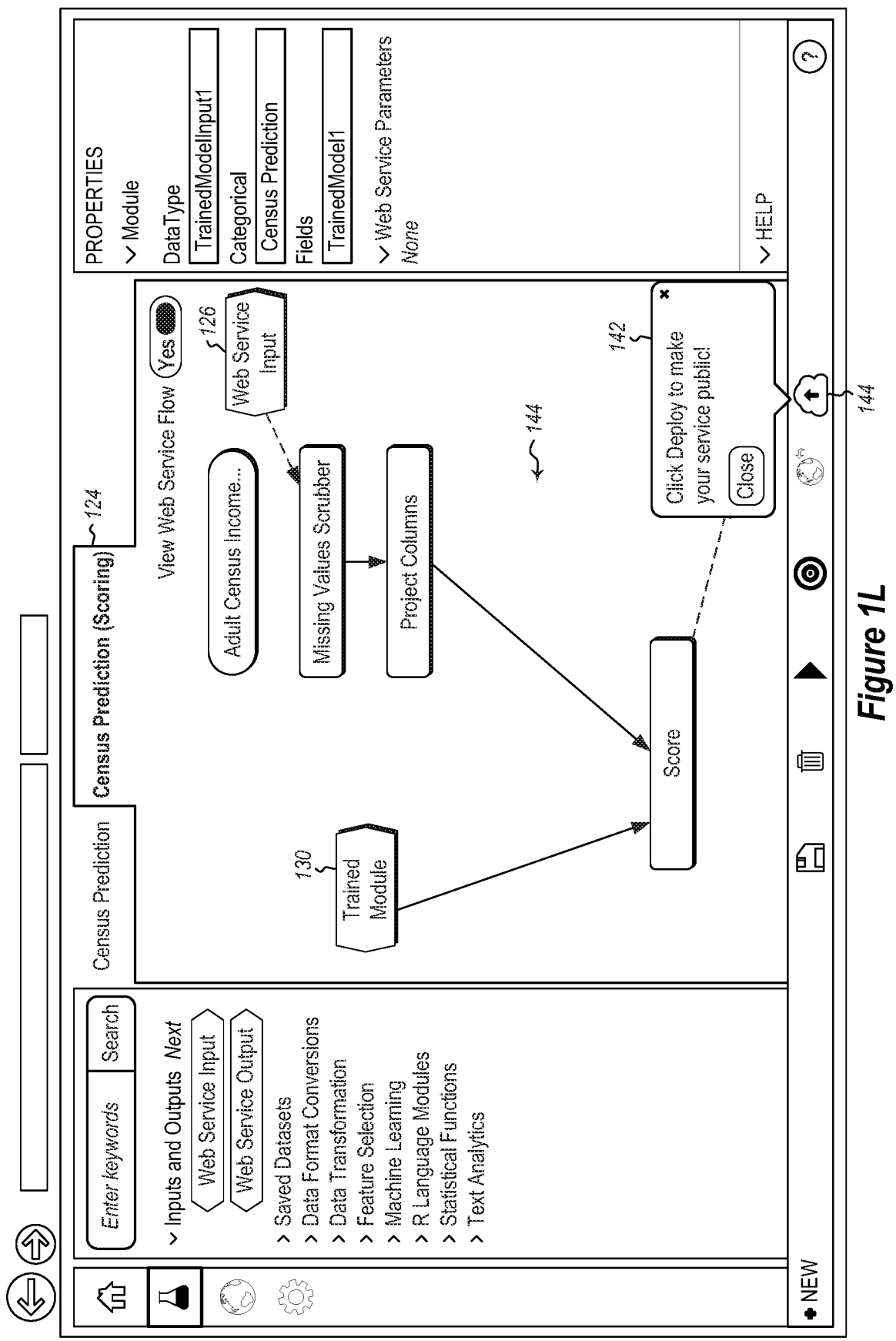
FIG. 1L illustrates another cue prompting a user to publish a scoring experiment.

FIG. 1L illustrates a cue 142 directing a user to a user interface element 144 that causes the scoring experiment to be published. In particular, interacting with the user interface element 144 can cause the scoring experiment 124 to be published to a web service.

Figure 1M:
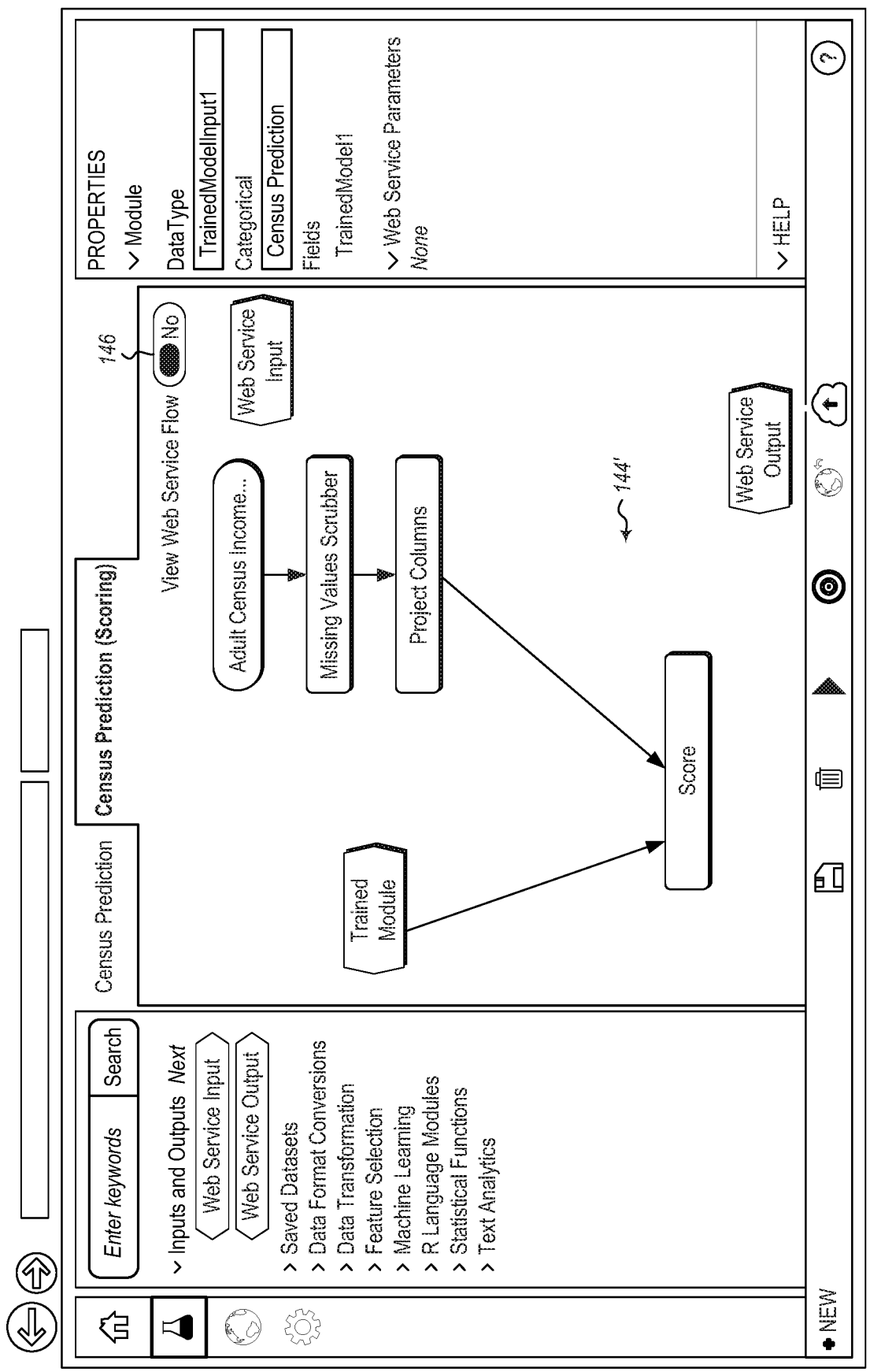
FIG. 1M illustrates a user interface element that allows for toggling between a web service view and a simple workflow view.

As discussed above, embodiments may include functionality that allows the user to view the scoring experiment graph in the context of a web service flow, or not in the context of a web service flow. FIGS. 1E through 1L illustrate the scoring experiment graph 144 in the context of a web service flow. FIG. 1M, in contrast, illustrates that a user has selected, using the user interface element 146, to show the scoring experiment graph 144' not in the context of a web service flow. In particular, while the graph 144' still includes the web service input node 126 and web service output node 128, the graph shows these two nodes 126 and 128 as not connected to the graph 144'. Thus, the example of FIG. 1M illustrates a scoring experiment graph 144' that is not in the context of a web service.

Figure 2:
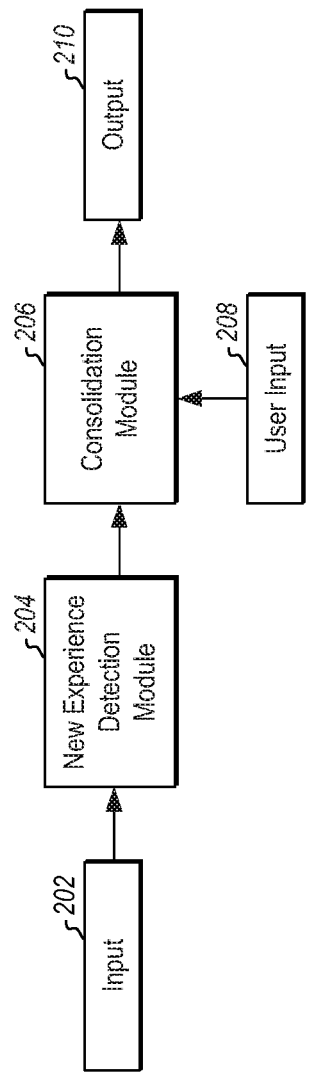
FIG. 2 illustrates a block diagram of an example system.

FIG. 2 illustrates a block diagram of one example system including technical means to achieve experiment consolidation. FIG. 2 illustrates input 202. The input 202 may be an experiment, such as a training experiment. The input 202 is provided to a new experiment detection module 204. The new experiment detection module 204 can determine if a new experiment could be created from the experiment in the input 202. This can be determined by characteristics of the experiment in the input 202. For example, embodiments may be able to determine that the experiment in the input 202 has a train module and an algorithm module, and this may be an indicator that the experiment is a training experiment for which a scoring experiment could be created.

When it is determined that a new experiment could be created, the previous experiment in the input 202 can be provided to a consolidation module 206. The consolidation module 206 can provide selectable elements to a user prompting the user that the experiment in the input 202 could be used to create a new experiment and requesting user input 208 indicating that a new experiment should be created. If the user indicates that a new experiment should be created through the user input 208, the experiment in the input 202 can be modified to create the new experiment, such as by removing certain elements and consolidating others. This new experiment can be provided as output 210 where it can be displayed to a user.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 3:
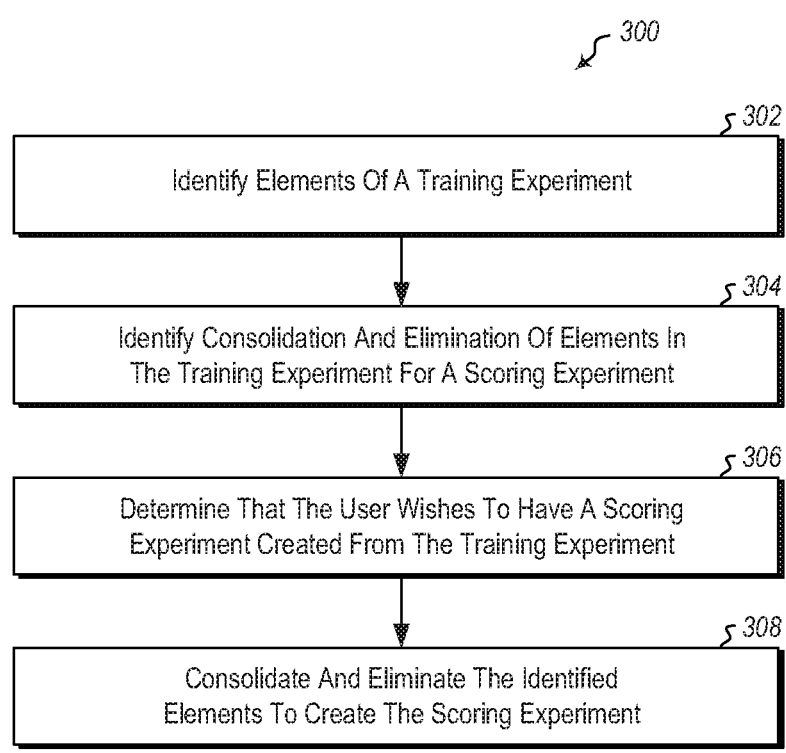
FIG. 3 illustrates a method of creating a scoring experiment from a training experiment.

Referring now to FIG. 3, a method 300 is illustrated. The method 300 may be practiced in a computing environment and includes acts for creating a scoring experiment from a training experiment. The method includes identifying elements of a training experiment (act 302). For example, various modules, such as those illustrated in FIG. 1A may be identified.

The method 300 further includes identifying consolidation and elimination of elements in the training experiment for a scoring experiment (act 304). For example, in FIGS. 1C and 1D illustrate that the split module 112, the score module 118, and the evaluate model module 120 can be identified for elimination. FIGS. 1E and 1F illustrate consolidation of the trained module 130, the algorithm module 104 and the train module 114. Embodiments may identify these modules for elimination and consolidation.

The method 300 further includes determining that the user wishes to have a scoring experiment created from the training experiment (act 306). For example as illustrated in FIG. 1C, a prompt 122 is illustrated. When the user interacts with the prompt, a determination can be made that the user wishes to have a scoring experiment created from a training experiment.

The method 300 further includes as a result, consolidating and eliminating the identified elements to create the scoring experiment (act 308). As discussed above, and as illustrated in FIGS. 1E and 1F, various modules can be identified and eliminated.

The method 300 may further include providing a graphical representation of the consolidation and elimination of identified elements. FIG. 1F shows a graphical representation of a screen shot of a consolidation operation. Thus, for example, embodiments may be implemented where the graphical representation is an animation.

The method 300 may further include adding elements to the scoring experiment for web service deployment. For example, FIG. 1E illustrates a web service input node 126 and a web service output node 128. Such embodiments may automatically deploy the web service deployment with the added elements.

Figure 4:
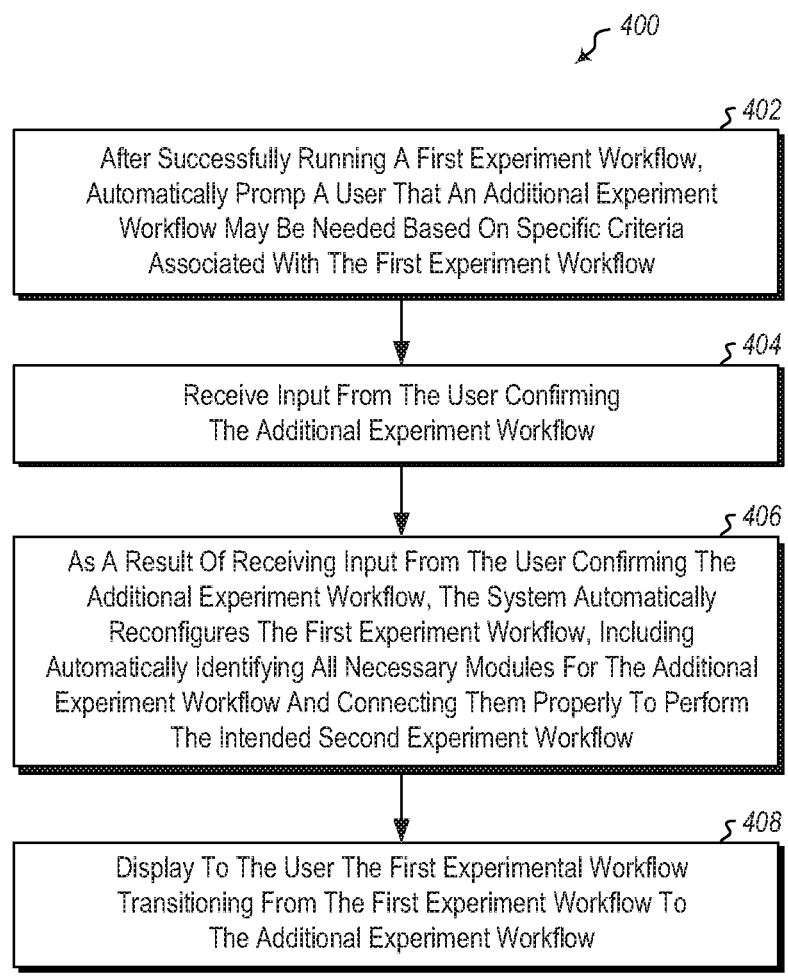
FIG. 4 illustrates a method of automatically detecting and anticipating that an additional machine learning experiment may be needed

Referring now to FIG. 4, a method 400 is illustrated. The method 400 may be practiced in a computing environment. The method 400 includes acts for automatically detecting and anticipating that an additional machine learning experiment may be needed.

The method 400 includes, after successfully running a first experiment workflow, automatically prompting a user that an additional experiment workflow may be needed based on specific criteria associated with the first experiment workflow (act 402). For example, FIG. 1B illustrates running the training experiment 100 and FIG. 1C illustrates a prompt 122 prompting the user.

The method 400 further includes receiving input from the user confirming the additional experiment workflow (act 404). For example, the user can interact with the prompt 122 confirming that an addition experiment workflow should be generated.

As a result of receiving input from the user confirming the additional experiment workflow, the method 400 further includes the system automatically reconfiguring the first experiment workflow, including automatically identifying all necessary modules for the additional experiment workflow and connecting them properly to perform the intended second experiment workflow (act 406). As discussed above, FIG. 1D illustrates the removal of certain elements and reconnecting of other elements, and FIG. 1F illustrates the consolidation of certain elements.

The method 400 further includes displaying to the user the first experimental workflow transitioning from the first experiment workflow to the additional experiment workflow (act 408). Thus, for example, an animation may be displayed with element floating off screen, elements being combined, etc.

As discussed above, and illustrated in FIG. 1D, the method 400 may be practiced where automatically reconfiguring the first experiment workflow comprises identifying and removing irrelevant portions of the first experiment workflow.

The method 400 may be practiced where the first experiment workflow is a training experiment workflow and where the additional experiment workflow is a scoring experiment workflow.

The method 400 may be practiced where the specific criteria associated with the first experiment comprises the existence of both an algorithm and a training module. Thus, as in the example illustrated above, by identifying that the training experiment includes both an algorithm module and a training module, it can be determined that a scoring experiment may need to be created.

The method 400 may further include populating and creating elements for web service deployment in the second experiment workflow. Thus, as illustrated in FIG. 1E, web service input and output nodes 126 and 128 may be added.

The method 400 may further include receiving user input approving the second experiment workflow and as a result, automatically deploying the workflow to a live web operation. Thus, as illustrated in FIG. 1L, a user may select the user interface element 144 to approve the second experiment.

The method 400 may further include displaying a user interface element that allows a user to toggle the additional experiment workflow between an online "live" connected mode and an offline "isolation" disconnected mode. FIG. 1M illustrates a user interface element 146 that can be used to toggle between the "live" connected (i.e. input and output nodes attached) and an offline "isolation" disconnected (i.e., with input and output nodes detached) modes.

The method 400 may be practiced where displaying to the user the first experimental workflow transitioning from the first experiment workflow to the additional experiment workflow comprises displaying an animation highlighting the transition. Thus, as illustrated above, and in particular in FIG. 1F and the corresponding description, embodiments may animate elimination and consolidation of elements.

The method 400 may further include displaying addition visual cues indicating what has happened to transition the first experiment workflow to the additional experiment workflow. Various visual cues are illustrated in the Figures at 132, 134, 136, 138, 140, and 142. Thus, these visual cues illustrate where embodiments may further include functionality for identifying key differences and their respective location on the user interface. In particular, by using the different representations of experiments, a user may be able to identify differences between experiments. In some embodiments, the identification of differences may be automated by performing machine comparisons of various experiments, or by keeping a log of changes performed to create one experiment from another. Embodiments may further include functionality for identifying key information to be conveyed based on the detected differences and locating suitable data, such as the cues, explaining the detected differences. Embodiments may further include functionality for associating each explanation data in a near a proximity to each detected difference to be explained.

Embodiments may further include functionality for comparing "before" and "after" workflow data. For example, by using the tabs illustrated in the user interface illustrated in the figures, a user can evaluate the before scenario of the training experiment 100 and the after scenario of the scoring experiment 124.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system configured to automatically detect and anticipate that an additional machine learning experiment is usable in response to a first experiment workflow being executed, said system comprising:
   one or more processors; and
   one or more storage devices that store executable instructions that are executable by the one or more processors to configure the system to:
   in response to detecting one or more specific criteria associated with a first experiment workflow, the specific criteria being configured to indicate that an additional experiment workflow may be needed, automatically generate and display a prompt for a user at a user interface that the additional experiment workflow may be needed based on the specific criteria associated with the first experiment workflow;
   receive input from the user at the user interface based at least on a user interaction with the prompt, the user interaction configured to confirm that the additional experiment workflow is needed;
   as a result of receiving input from the user at the user interface confirming the additional experiment workflow, reconfigure the first experiment workflow, including automatically identifying and connecting modules for the additional experiment workflow; and
   display to the user at the user interface the additional experiment workflow.

2. The system of claim 1, wherein the stored executable instructions are further executable by the one or more processors to further configure the system to: automatically reconfigure the first experiment workflow by identifying and removing irrelevant portions of the first experiment workflow.

3. The system of claim 1, wherein the first experiment workflow is a training experiment workflow and wherein the additional experiment workflow is a scoring experiment workflow that comprises a fully trained experiment workflow, such that the fully trained experiment workflow is created only upon receiving the input from the user confirming that the additional experiment workflow is to be created.

4. The system of claim 1, wherein the specific criteria associated with the first experiment comprises the existence of both an algorithm and a training module.

5. The system of claim 1, wherein the stored executable instructions are further executable by the one or more processors to further configure the system to populate and create elements for web service deployment in the second experiment workflow.

6. The system of claim 1, wherein the stored executable instructions are further executable by the one or more processors to further configure the system to receive user input approving the second experiment workflow and as a result, automatically deploy the workflow to a live web operation.

7. The system of claim 1, wherein the stored executable instructions are further executable by the one or more processors to further configure the system to display a user interface element that allows a user to toggle the additional experiment workflow between a connected mode and a disconnected mode.

8. The system of claim 1, wherein the system is configured to display to the user the first experimental workflow transitioning from the first experiment workflow to the additional experiment workflow by displaying an animation highlighting the transition.

9. The system of claim 1, wherein the stored executable instructions are further executable by the one or more processors to further configure the system to display additional visual cues indicating what has happened to transition the first experiment workflow to the additional experiment workflow.

10. The system of claim 1, further comprising:
    a filter module, wherein prior to running the first experiment workflow, the filter module transforms a data set to be used during the first experiment by applying one or more of an Apply, FIR, IIR, Median, Moving Average, Threshold, or User Defined filter.

11. The system of claim 1, further comprising:
    a manipulation module, wherein prior to running the first experiment workflow, the manipulation module transforms a data set to be used during the first experiment by applying one or more of an Add Column, Add Row, Group Categorical Values, Indicator Value, Join, Metadata Editor, Missing Values Scrubber, Project Columns, or Remove Duplicate Rows function.

12. The system of claim 11, wherein the manipulation module applies the Missing Values Scrubber.

13. The system of claim 1, wherein the additional experiment workflow is a consolidation of the first experiment workflow that omits at least some elements from the first experiment workflow.

14. The system of claim 1, wherein the system is configured to display to the user the first experimental workflow transitioning from the first experiment workflow to the additional experiment workflow by displaying an animation with unnecessary elements from the first experiment workflow being shown floating off screen.

15. The system of claim 1, the specific criteria being first specific criteria, the automatic user prompt being a first automatic user prompt, input from the user being first input from the user, and the additional experiment workflow being a first additional experiment workflow,
- wherein after successfully running a third experiment workflow, and in response to detecting the second specific criteria associated with the first experiment workflow, the stored executable instructions are further executable by the one or more processors to further configure the system to:
- automatically prompt a user with a second automatic user prompt that creation of a second additional experiment workflow may be needed;
- receive input from the user denying that the second additional experiment workflow is to be created; and
- as a result of input from the user denying that the second additional experiment workflow is to be created, refrain from creating the second additional experiment workflow.

16. A system for creating a scoring experiment from a training experiment, the system comprising:
- one or more processors; and
- one or more computer-readable media that store computer-executable instructions that are executable by at least one of the one or more processors to cause the system to:
  - in response to detecting specific criteria associated with a training experiment, identify specific elements of the training experiment;
  - automatically prompt a user with an automatic user prompt that creation of scoring experiment may be needed, based at least in part on detecting the identified specific elements associated with the training experiment, wherein the automatic user prompt is presented at a user interface concurrently with at least a portion of the training experiment;
  - receive input from the user at the user interface based at least on a user interaction with the automatic user prompt, the user interaction configured to confirm that the scoring experiment is needed;
  - identify components in the training experiment for a scoring experiment; and
  - use the components to create the scoring experiment.

17. The system of claim 16, wherein the stored executable instructions are further executable by the one or more processors to further configure the system to present a graphical representation of consolidation and/or elimination of the identified components.

18. The system of claim 17, wherein the graphical representation is an animation.

19. The system of claim 16, wherein the stored executable instructions are further executable by the one or more processors to further configure the system to add components to the scoring experiment for web service deployment.

20. The system of claim 19, wherein the stored executable instructions are further executable by the one or more processors to further configure the system to automatically deploy the web service deployment with the components.

* * * * *